2,980,724
PREPARATION OF DIALKYL PHOSPHORIC ACIDS

James P. Hawk, Edmund B. Towne, and Joseph B. Dickey, Kingsport, Tenn., assignors to Eastman Kodak Company, Rochester, N.Y., a corporation of New Jersey No Drawing. Filed July 24, 1959, Ser. No. 829,192

8 Claims. (Cl. 260—461)

This invention relates to a new method for preparing dialkyl phosphoric acids.

Dialkyl phosphoric acids, sometimes referred to as dialkyl phosphates, can be employed for a wide variety of uses, typical uses being in the preparation of various organophosphorus compounds and as extracting and flotation media for extracting uranium trioxide from uranium ore. Typical uses of dialkyl phosphoric acids are disclosed in U.S. 2,691,566 and U.S. 2,734,868.

Heretofore, dialkyl phosphoric acids have been produced by several procedures but each of these procedures suffers from one or more disadvantages. For example, dialkyl phosphoric acids have been prepared from aliphatic alcohols and phosphorus pentoxide. The process not only yields a mixture of monoalkyl phosphoric acids and dialkyl phosphoric acids, but also trialkyl esters. Dialkyl phosphoric acids can be prepared by the esterification of alcohols with phosphoric acid which yields mixtures similar to those described for the reaction of an aliphatic alcohol and phosphorus pentoxide. Also, linear polyphosphoric acids or their salts can be hydrolyzed to produce esters of phosphoric acid, but the product generally contains a high proportion of the primary ester unless very pure tertiary alkyl pyrophosphoric acid is used.

Dialkyl phosphoric acids have been produced by other hydrolysis procedures, for example, by the hydrolysis of halophosphates and trialkyl phosphates. These hydrolysis reactions are difficult to control and the products are difficult to isolate from the aqueous hydrolysis medium.

It is an object of this invention to provide a new method for preparing dialkyl phosphoric acids.

It is another object of this invention to provide a novel process for preparing dialkyl phosphoric acids in high yields and purity.

It is a further object of this invention to prepare by a new process dialkyl phosphoric acid from dialkyl hydrogen phosphites.

It is a still further object of this invention to provide a new process for preparing such dialkyl phosphoric acids as diethyl phosphoric acid, di(2-ethylhexyl) phosphoric acid and the like, and which process is characterized in that unreacted reagents and solvent can be readily separated from the dialkyl phosphoric acid reaction product.

These and other objects of the invention are accomplished by reacting dialkyl hydrogen phosphites with percarboxylic acids. The reaction of the invention can be represented by the following general equations:

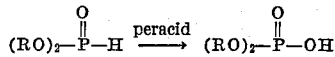

wherein R is an alkyl radical.

A wide variety of dialkyl hydrogen phosphites can be employed in the subject process. Preferred dialkyl hydrogen phosphites have alkyl radicals containing 1 to 10 carbon atoms. The dialkyl hydrogen phosphite starting materials can contain either straight or branched chain alkyl groups. Typical dialkyl hydrogen phosphites that can be suitably oxidized to dialkyl phosphoric acid include dimethyl hydrogen phosphite, diethyl hydrogen phosphite, di-n-propyl hydrogen phosphite, di-isobutyl hydrogen phosphite, diamyl hydrogen phosphite, di-n-hexyl hydrogen phosphite, di(2-ethylhexyl) hydrogen phosphite, didecyl hydrogen phosphite and related dialkyl hydrogen phosphites.

The oxidizing material in the subject process is a percarboxylic acid having the general formula

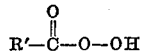

wherein R' can be a cyclic radical such as an aryl radical as well as a straight or branched radical such as an alkyl radical. Particularly effective percarboxylic acids are the peralkanoic acids, especially those having 2 to 6 carbon atoms. Peracetic acid is preferred and it has the practical advantage of being economical and readily obtainable. Typical percarboxylic acids in addition to peracetic acid include, per-n-propionic acid, per-in-butyric acid, p-tert.-butyric acid, pervaleric acid, percaproic acid, perbenzoic acid and the like.

A one mole proportion of percarboxylic acid is utilized for each mole proportion of dialkyl hydrogen phosphite oxidized to dialkyl phosphoric acid. However, a stoichiometric excess of the percarboxylic acid oxidizing agent is more generally utilized to assure the substantially complete reaction of the dialkyl hydrogen phosphite.

In carrying out the present oxidation reaction the dialkyl hydrogen phosphite and the percarboxylic acid are associated or admixed, desirably with agitation or stirring. As the present reaction is exothermic the percarboxylic acid is desirably added to the dialkyl hydrogen phosphite at a controlled rate to maintain the reaction in a desired reaction temperature range. Reaction temperatures in the range of about 40° to 100° C., and preferably in the range of about 60° to 80° C., are utilized. The percarboxylic acid is added to the reaction mixture in a suitable organic solvent for the percarboxylic acid. Desirably a solvent that can be readily separated from the dialkyl phosphoric acid reaction product by distillation is utilized. Typical solvents that can be suitably employed include acetic acid, ethyl acetate, benzene, diethyl ether, methanol, acetone and related organic solvents. The amount of solvent employed can be widely varied in accordance with usual chemical practice, but generally the percarboxylic acid is dissolved in about 25% to 75% by volume of solvent, with about 50% by volume being especially useful. The oxidation reaction is carried out until a substantial proportion of the dialkyl hydrogen phosphite is converted to dialkyl phosphoric acid, and usually until substantially all of the dialkyl hydrogen phosphite reactant is consumed. The reaction time varies widely with such factors as the reaction temperature, the amount of agitation, the nature of the reactants, the concentration of the reactants and related reaction variants. Usually the percarboxylic acid is added to the dialkyl hydrogen phosphite over a period of 1 to 3 hours, and the resulting mixture maintained at the reaction temperature for several hours, usually 2 to 8 hours, although shorter or longer reaction periods can be utilized. The resulting reaction mixture can be "worked up" or purified by such conventional methods as solvent extraction, distillation and the like. A convenient method for removing unreacted percarboxylic acid and solvent is to reduce the pressure in the reaction vessel, maintain the reaction temperature, and thereby strip off such materials. The present process for preparing dialkyl phosphoric acids is characterized in producing products in high purity and in high yields, yields of the magnitude of 80%, 90% or more being obtainable.

That dialkyl hydrogen phosphites could be so readily oxidized to dialkyl phosphoric acids was unexpected in view of the teachings in the prior art. Dialkyl hydrogen phosphites,

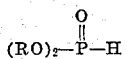

exist in a keto form and Kosolapoff in his textbook entitled "Organophosphorous Compounds" published by John Wiley & Sons, 1950, starting at the bottom of page 193, states that such keto forms lack oxidizability. However, we have found that dialkyl hydrogen phosphites can be readily oxidized to dialkyl phosphoric acid with percarboxylic acids as described herein. We have attempted to oxidize dialkyl hydrogen phosphites with a 30% hydrogen peroxide aqueous solution under the conditions utilized in the present process and an oxidation product composed mainly of monoalkyl phosphoric diacid was obtained, only a small amount of dialkyl phosphoric acid resulting. We carried out additional experiments under the following oxidizing conditions and obtained no appreciable amount of dialkyl phosphoric acids from corresponding dialkyl hydrogen phosphites: air or oxygen at 50° to 80° C. in benzene, oxygen and no solvent at 70° C., air with a cobalt stearate catalyst at 70° C. in benzene, and air, cobalt acetate, acetaldehyde activation at 90° C. in acetic acid.

The present invention of oxidizing dialkyl hydrogen phosphites to dialkyl phosphoric acids is illustrated by the following examples describing preferred embodiments thereof.

*Example 1*

A 61.2 gram (0.2 mole) portion of di(2-ethylhexyl) hydrogen phosphite was placed in a glass reaction vessel equipped with a stirrer. The di(2-ethylhexyl) hydrogen phosphite was heated to 60° C. and with rapid stirring 19 grams (0.256 mole) of peracetic acid and an equal volume of glacial acetic acid were fed into the reaction vessel over approximately a 2 hour period at a rate such that the heat of reaction maintained the temperature in the reaction vessel at 60° to 70° C. After the addition of the peracetic acid, the 60° to 70° C. reaction temperature was maintained for an additional 4 hours. The acetic acid solvent and any unreacted peracetic acid were then removed from the resulting reaction mixture by reducing the pressure (20 to 50 mm. Hg) in the reaction vessel, the temperature being maintained at 60° to 70° C. The resulting water white residual material weighed 64 grams and analyzed 88% di(2-ethylhexyl) phosphoric acid for a yield of 90%.

*Example 2*

A 0.2 mole portion of diethyl hydrogen phosphite was reacted with a 0.226 mole portion of peracetic acid in an equal volume of acetic acid as described in Example 1 except that the reactants were maintained at a temperature in the range of 60° to 80° C. for a total of 7 hours. The acetic acid solvent and any unreacted peracetic acid were then removed from the resulting diethyl phosphoric acid product under reduced pressure as described in Example 1.

*Example 3*

A 0.2 mole portion of di(2-ethylhexyl) hydrogen phosphite is oxidized to di(2-ethylhexyl) phosphoric acid with a 0.256 mole portion of perbenzoic acid in an equal weight of diethyl ether by the method described in Example 1.

While the invention has been described in detail with reference to certain preferred embodiments thereof, it will be understood that variations and modifications can be effected within the spirit and scope of the invention as described hereinabove and as defined in the appended claims.

We claim:

1. The process for preparing a dialkyl phosphoric acid which comprises reacting a dialkyl hydrogen phosphite having alkyl radicals containing 1 to 10 carbon atoms with a percarboxylic acid at a temperature in the range of 40° to 100° C.

2. The process for preparing a dialkyl phosphoric acid which comprises reacting a dialkyl hydrogen phosphite having alkyl radicals containing 1 to 10 carbon atoms with a peralkanoic acid having 2 to 6 carbon atoms at a temperature in the range of 40° to 100° C.

3. The process according to claim 2 wherein the dialkyl hydrogen phosphite is di(2-ethylhexyl) hydrogen phosphite.

4. The process according to claim 2 wherein the dialkyl hydrogen phosphite is diethyl hydrogen phosphite.

5. The process according to claim 2 wherein the peralkanoic acid is peracetic acid.

6. The process which comprises reacting diethyl hydrogen phosphite with peracetic acid in acetic acid at a temperature in the range of 60° to 80° C. and oxidizing a substantial proportion of said diethyl hydrogen phosphite to diethyl phosphoric acid with said peracetic acid.

7. The process which comprises reacting di(2-ethylhexyl) hydrogen phosphite with peracetic acid in acetic acid at a temperature in the range of 60° to 80° C. and oxidizing a substantial proportion of said di(2-ethylhexyl) hydrogen phosphite to di(2-ethylhexyl) phosphoric acid with said peracetic acid.

8. The process which comprises reacting di(2-ethylhexyl) hydrogen phosphite with perbenzoic acid in an organic solvent at a temperature in the range of 60° to 80° C. and oxidizing a substantial proportion of said diethyl hydrogen phosphite to diethyl phosphoric acid with said perbenzoic acid.

References Cited in the file of this patent

UNITED STATES PATENTS

| | | |
|---|---|---|
| 2,059,084 | Buchheim | Oct. 27, 1936 |
| 2,921,087 | Coover et al. | Jan. 12, 1960 |

FOREIGN PATENTS

| | | |
|---|---|---|
| 1,053,485 | Germany | Mar. 26, 1959 |